United States Patent
Trönnberg

(10) Patent No.: US 9,109,634 B2
(45) Date of Patent: Aug. 18, 2015

(54) ACTUATOR WITH FACE DOG CLUTCH

(71) Applicant: eAAM Driveline Systems AB, Trollhättan (SE)

(72) Inventor: Gabriel Per Erik Ivar Trönnberg, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 37 days.

(21) Appl. No.: 14/059,820

(22) Filed: Oct. 22, 2013

(65) Prior Publication Data
US 2015/0107955 A1    Apr. 23, 2015

(51) Int. Cl.
*F16D 11/10*    (2006.01)
*F16D 125/40*   (2012.01)

(52) U.S. Cl.
CPC ............ *F16D 11/10* (2013.01); *F16D 2125/40* (2013.01)

(58) Field of Classification Search
CPC .............................. F16D 11/10; F16D 2125/40
USPC ........... 192/69.8, 96, 101, 90, 69, 66.1, 85 A, 192/70.24, 93 B, 91 A, 93 C, 93 A; 74/335
See application file for complete search history.

(56) References Cited

U.S. PATENT DOCUMENTS

| | | | |
|---|---|---|---|
| 1,193,008 A * | 8/1916 | Fuller | 192/24 |
| 3,550,738 A | 12/1970 | Halibrand | |
| 4,307,795 A * | 12/1981 | Roy | 192/69.82 |
| 4,685,550 A | 8/1987 | Metcalf | |
| 5,573,096 A * | 11/1996 | Erlebach | 192/110 R |
| 5,878,624 A | 3/1999 | Showalter et al. | |
| 6,494,662 B1 * | 12/2002 | De Montalembert | 414/1 |
| 6,701,796 B2 * | 3/2004 | Blanchard | 74/325 |
| 7,665,589 B2 * | 2/2010 | Blanchard | 192/46 |
| 8,042,415 B2 * | 10/2011 | Ito | 74/89.23 |
| 2009/0247346 A1 * | 10/2009 | Hvolka et al. | 475/155 |
| 2010/0089685 A1 * | 4/2010 | Quehenberger et al. | 180/383 |
| 2010/0236343 A1 * | 9/2010 | Chiang et al. | 74/89.34 |
| 2010/0242642 A1 * | 9/2010 | Ganter | 74/89.23 |
| 2012/0058855 A1 | 3/2012 | Sten | |
| 2012/0253577 A1 * | 10/2012 | Schaeffer et al. | 701/22 |

* cited by examiner

*Primary Examiner* — David J Hlavka
(74) *Attorney, Agent, or Firm* — Harness, Dickey & Pierce, P.L.C.

(57) ABSTRACT

A clutch and actuator assembly having first and second clutch dogs and an actuator assembly. The second clutch dog is configured to disengage from the first clutch dog when rotary power is transmitted between the first and second clutch dogs. The actuator assembly is configured to lock when the second clutch dog to thereby inhibit automatic disengagement of the second clutch dog from the first clutch dog.

20 Claims, 2 Drawing Sheets

ACTUATOR WITH FACE DOG CLUTCH

FIELD

The present disclosure relates to an actuator with a face dog clutch.

BACKGROUND

This section provides background information related to the present disclosure which is not necessarily prior art.

It is known in the art to employ clutch dogs with face teeth (i.e., a face dog clutch) to selectively transmit rotary power between an input shaft and an output shaft. While such devices are suited for their intended purpose, there remains a need in the art for an improved face dog clutch.

SUMMARY

This section provides a general summary of the disclosure, and is not a comprehensive disclosure of its full scope or all of its features.

In one form, the present teachings provide clutch and actuator assembly that includes a first shaft, a first clutch dog fixedly coupled to the first shaft for common rotation, a second shaft, a second clutch dog non-rotatably but axially slidably received on the second shaft, and an actuator assembly. The actuator assembly has an output member that is configured to slide the second clutch dog on the second shaft between a first position, in which the second clutch dog is engaged to the first clutch dog, and a second position in which the second clutch dog is spaced apart from the first clutch dog so that rotary power cannot be transmitted between the first and second clutch dogs. The second clutch dog is configured to disengage from the first clutch dog when rotary power is transmitted between the first and second clutch dogs. The actuator assembly is configured to lock when the output member has moved the second clutch dog is in the first position to inhibit disengagement of the second clutch dog from the first clutch dog.

In another form, the present teachings provide a clutch and actuator assembly that includes a first shaft, a first clutch dog fixedly coupled to the first shaft for common rotation, a second shaft, a second clutch dog non-rotatably but axially slidably received on the second shaft, and an actuator assembly. The first clutch dog has a plurality of first dog teeth. Each of the first dog teeth has a pair of opposed first flanks and a first tip. Each pair of opposed first flanks taper toward one another with decreasing distance to a corresponding one of the first tips. The second clutch dog has a plurality of second dog teeth. Each of the second dog teeth has a pair of opposed second flanks and a second tip. Each pair of opposed second flanks taper toward one another with decreasing distance to a corresponding one of the second tips. The actuator assembly has an output member that is configured to slide the second clutch dog on the second shaft between a first position, in which the second clutch dog is engaged to the first clutch dog, and a second position in which the second clutch dog is spaced apart from the first clutch dog so that rotary power cannot be transmitted between the first and second clutch dogs. The actuator assembly is configured to lock when the output member has moved the second clutch dog into the first position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
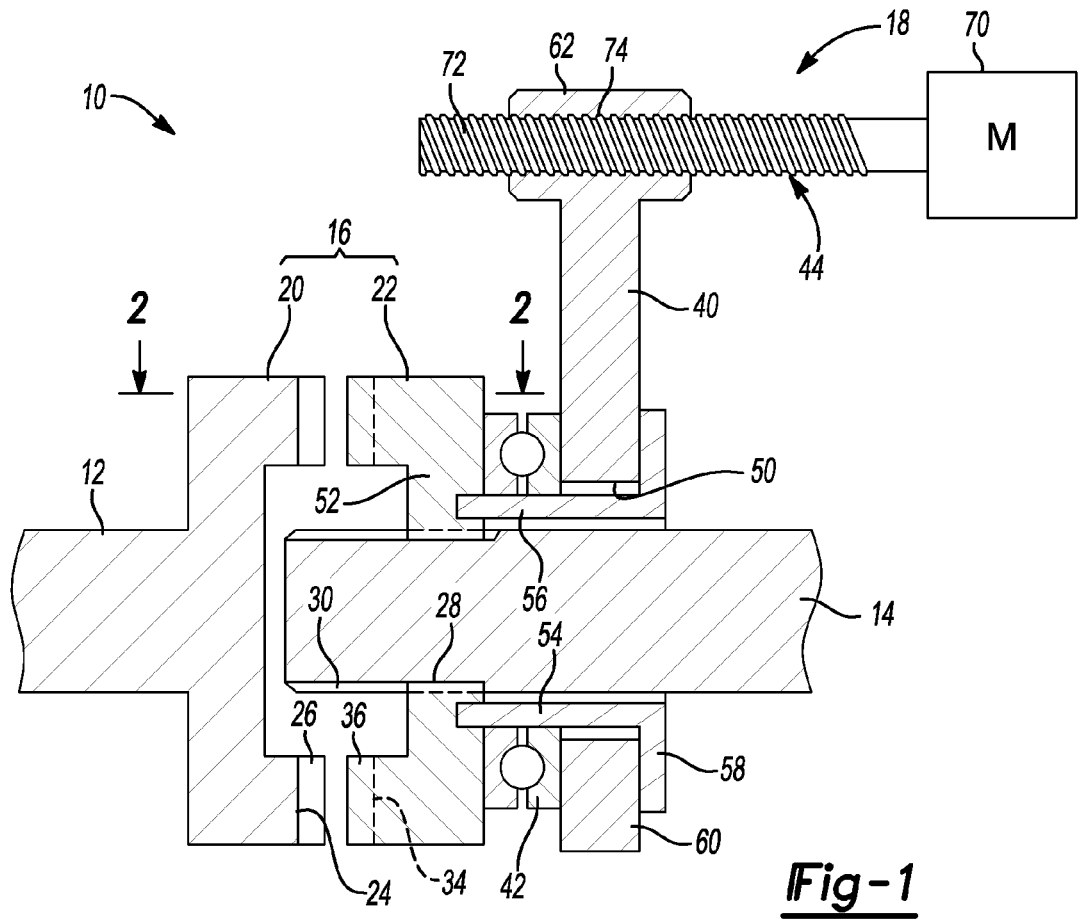
FIG. 1 is a section view of a first clutch and actuator assembly constructed in accordance with the teachings of the present disclosure.

With reference to FIG. 1 of the drawings, a clutch and actuator assembly constructed in accordance with the teachings of the present disclosure is generally indicated by reference numeral 10. The clutch and actuator assembly 10 are configured to selectively transmit rotary power between a first shaft 12 and a second shaft 14. The clutch and actuator assembly 10 can include a clutch assembly 16 and an actuator assembly 18.

The clutch assembly 16 can comprise a first clutch dog 20 and a second clutch dog 22. The first clutch dog 20 can be fixedly coupled to the first shaft 12 for rotation therewith and can have a first clutch profile 24 with a plurality of first clutch teeth 26. The second clutch dog 22 can be non-rotatably but axially slidably mounted to the second shaft 14. In the particular example provided, the second clutch dog 22 has an internally splined aperture 28 that is matingly received on an externally splined segment 30 of the second shaft 14. The second clutch dog 22 can having a second clutch profile 34 with a plurality of second clutch teeth 36.

Figure 2:
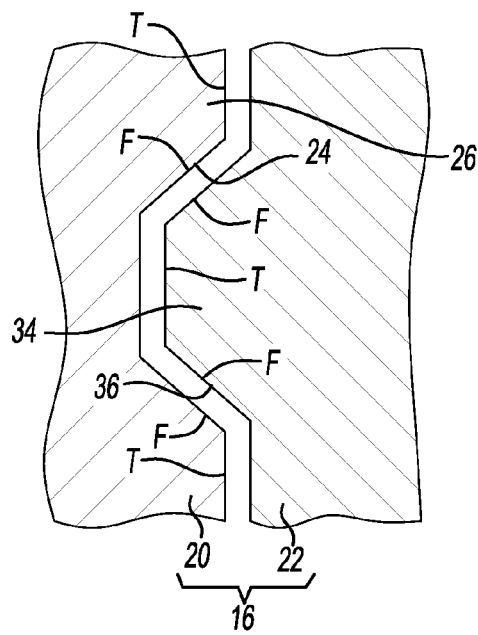
FIG. 2 is a section view taken along the line 2-2 of FIG. 1 when first and second clutch dogs are engaged to one another.

With additional reference to FIG. 2, the first and second clutch profiles 24 and 34 can be configured such that the second dog clutch—tends to disengage the first clutch dog 20 when a rotary load of a predetermined magnitude is transmitted between the first and second clutch dogs 20 and 22. More specifically, the first and second clutch teeth 26 and 36 can be shaped so that when a rotary load is transmitted through the first and second clutch teeth 26 and 36, an axial reaction force is produced that urges the second clutch dog 22 in an axial direction away from the first clutch dog 20. In the particular example provided, the first and second clutch teeth 26 and 36 have an isosceles trapezoidal shape in which the legs and the smaller of the two bases of the isosceles trapezoid that form given ones of the first and second clutch teeth 26 and 36 also define respective portions of the first and second clutch profiles 24 and 34. Stated another way, the first and second clutch teeth 26 and 36 are configured with opposite tooth flanks F that extend toward one another with decreasing distance to a corresponding end or tip T of the teeth.

Returning to FIG. 1, the actuator assembly 18 can be any type of linear actuator that is configured to move the second clutch dog 22 in an axial direction along the second shaft 14 between a first position, in which the second clutch profile 34 is matingly engaged to the first clutch profile 24, and a second position in which the second clutch profile 34 is spaced apart from the first clutch profile 24 to an extent where rotary power is not transmitted between the first and second clutch dogs 20 and 22. For example, the actuator assembly 18 can comprise a clutch fork 40, a thrust bearing 42 and a linear motor 44. The clutch fork 40 can be the output member of the actuator assembly 18 and can be received in a fork groove 50 formed in the second clutch dog 22. In the example provided, the second clutch dog 22 comprises a body member 52 on which the second clutch profile 34 and the internally splined aperture 28 are formed, and a tubular member 54 that is fixedly coupled to the body member 52 on a side opposite the second clutch profile 34. The tubular member 54 can have a hollow cylindrical body portion 56, which can have a first end that can be fixedly coupled to the body member 52, and a second, opposite end that can define a shoulder 58. The clutch fork 40 can include a fork member 60, which can be received over the cylindrical body portion 56 and can be abutted against the shoulder 58, and a drive member 62 that can be coupled to or driven by the linear motor 44. The thrust bearing 42 can be received between the fork member 60 and the body member 52 of the second clutch dog 22.

The linear motor 44 can be any type of linear motor, including a cylinder (pneumatic or hydraulic), or an electrically-driven solenoid, but in the particular example provided, the linear motor 44 comprises a rotary motor 70, a lead screw 72, which is coupled to an output shaft (not specifically shown) of the rotary motor 70 for rotation therewith, and a mating female thread form 74 that can be formed in the drive member 62 and threadably engaged to the lead screw 72. As the rotary motor 70 can be fixedly and non-rotatably mounted to an appropriate structure, such as a housing (not shown), operation of the rotary motor 70 can cause corresponding rotation of the lead screw 72 and thereby corresponding axial motion of the clutch fork 40. The lead screw 72 and the mating female thread form 74 can be formed so that the lead screw 72 is self-locking.

The rotary motor 70 can be operated to rotate the lead screw 72 to cause the clutch fork 40 to push the second clutch dog 22 into the second position such that the second clutch profile 34 engages the first clutch profile 24. The transmission of rotary power through the first and second clutch teeth 26 and 36 can transmit an axial force to the second clutch dog 22 that would normally urge the second clutch dog 22 away from the first clutch dog 20 as described above. The self-locking aspect of the lead screw 72, however, resists axial movement of the second clutch dog 22 and consequently, the second clutch teeth 36 are not able to disengage the first clutch teeth 26 so that rotary power can be transmitted through the clutch assembly 16.

Figure 3:
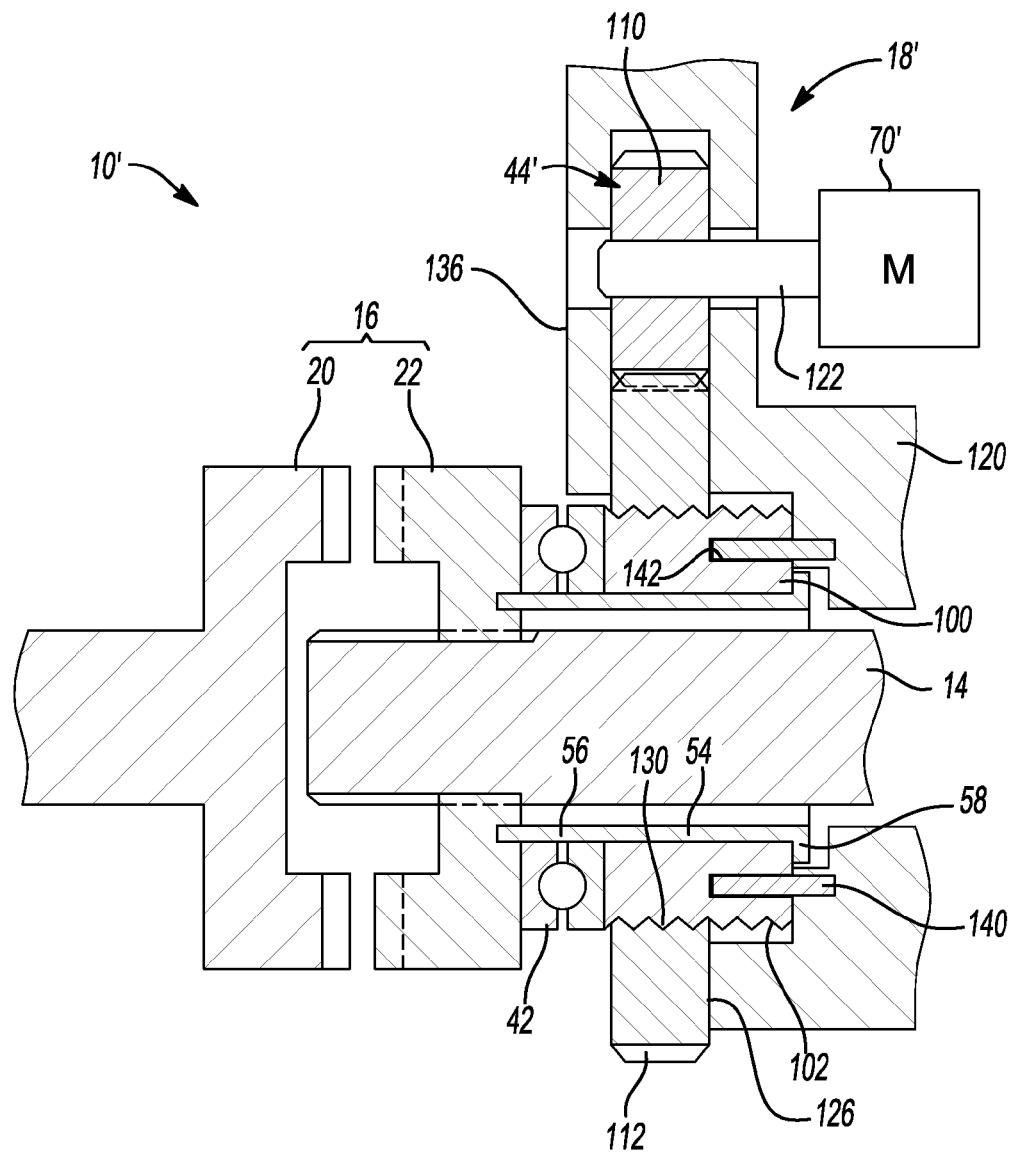
FIG. 3 is a section view of a second clutch and actuator assembly constructed in accordance with the teachings of the present disclosure.

With reference to FIG. 3, a second clutch and actuator assembly constructed in accordance with the teachings of the present disclosure are generally indicated by reference numeral 10'. The clutch and actuator assembly 10' can be generally similar to the clutch and actuator assembly 10 (FIG. 1), except that the actuator assembly 18' comprises a pusher 100, the thrust bearing 42 and a linear motor 44'. The pusher 100 can be concentrically and non-rotatably mounted about the second shaft 14. The pusher 100 can be axially movably but non-rotatably coupled to the housing 120 in any desired manner. For example, a plurality of cylindrical pins 140 can be fixedly mounted to one of the pusher 100 and the housing 120; the pins 140 can be received into axially extending holes 142 formed in the other one of the pusher 100 and the housing 120. In the example provided, the pins 140 are fixedly mounted to the housing 120, while the holes 142 are formed in the pusher 100. A plurality of external threads 102 can be formed on the outside diameter of the pusher 100. The thrust bearing 42 can be received on the cylindrical body portion 56 of the tubular member 54 axially between the pusher 100 and the second clutch dog 22. The shoulder 58 of the tubular member 54 can be abutted against the pusher 100 on an axial end of the pusher 100 that is opposite to the end of the pusher 100 that abuts the thrust bearing 42. The linear motor 44' can be configured to move the pusher 100 in an axial direction along the second shaft 14. The linear motor 44' can include a rotary motor 70', an input pinion gear 110 and an output gear 112. The rotary motor 70' can be fixedly mounted to an appropriate structure, such as a housing 120 of the clutch and actuator assembly 10', and can have an output shaft 122 to which the input pinion gear 110 can be coupled for common rotation. The output gear 112 can be an annular gear with a reaction face 126 that can be abutted against a structure such as the housing 120. Optionally, the output gear 112 can be rotatably but axially coupled to the structure (e.g., housing 120) in any desired manner to permit relative rotation therebetween while limiting relative axial movement therebetween. The output gear 112 can have a set of teeth formed about its outside diameter that can be meshed with the teeth of the input pinion gear 110. A set of internal threads 130 can be formed on inside diametrical surface of the output gear 112. The set of internal threads 130 can be threadably engaged to the external threads 102 formed on the pusher 100 so that the pusher 100 is telescopically received into the output gear 112. The geometry of these threads can be designed such that, given the friction forces counteracting relative motion between moving members, no axial force on the pusher 100 can cause rotation of the output gear 112.

The rotary motor 70' can be operated to rotate the input pinion gear 110 to cause corresponding rotation of the output gear 112 and the pusher 100. Due to contact between the reaction face 126 and the housing 120, rotation of the input pinion gear 110 in a first rotational direction can cause the pusher 100 to move axially toward the first clutch dog 20 to thereby drive the second clutch dog 22 into engagement with the first clutch dog 20. The transmission of rotary power through the first and second clutch teeth 26 and 36 can transmit an axial force to the second clutch dog 22 that would normally urge the second clutch dog 22 away from the first clutch dog 20 as described above. The linear motor 44', however, can maintain the pusher 100 in a position in which the second clutch teeth 36 are engaged to the first clutch teeth 26.

Rotation of the input pinion gear 110 in a second, opposite rotational direction can facilitate the disengagement of the second clutch dog 22 from the first clutch dog 20. To the extent that there is any axial load on the output gear 112, such load may be transmitted to the housing 120 in any suitable manner, such as through contact with a second reaction face 136 and the housing 120. Clearance between the output gear 112 and the housing 120 can be configured as desired to control the time for connecting/disconnecting, NVH, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clutch and actuator assembly comprising:
   a first shaft;
   a first clutch dog fixedly coupled to the first shaft for common rotation;
   a second shaft;
   a second clutch dog non-rotatably but axially slidably received on the second shaft; and
   an actuator assembly having an output member that is configured to slide the second clutch dog on the second shaft between a first position, in which the second clutch dog is engaged to the first clutch dog, and a second position in which the second clutch dog is spaced apart from the first clutch dog so that rotary power cannot be transmitted between the first and second clutch dogs;
   wherein the second clutch dog is configured to disengage from the first clutch dog when rotary power is transmitted between the first and second clutch dogs; and
   wherein the actuator assembly is configured to self-lock when the output member has moved the second clutch dog into the first position to thereby inhibit disengagement of the second clutch dog from the first clutch dog.

2. The clutch and actuator assembly of claim 1, wherein the output member of the actuator assembly comprises a clutch fork.

3. The clutch and actuator assembly of claim 2, wherein the actuator assembly comprises a lead screw and wherein the clutch fork is threaded onto the lead screw.

4. The clutch and actuator assembly of claim 3, wherein a thrust bearing is disposed between the clutch fork and the second clutch dog.

5. The clutch and actuator assembly of claim 3, wherein the actuator assembly comprises a pusher and an output gear that is threaded to the pusher such that the pusher is telescopically coupled to the output gear.

6. The clutch and actuator assembly of claim 5, wherein the actuator assembly further comprises a rotary motor and a pinion gear driven by the rotary motor, the pinion gear being meshed to the output gear.

7. The clutch and actuator assembly of claim 6, wherein the pinion gear is directly driven by the rotary motor.

8. The clutch and actuator assembly of claim 1, wherein the second clutch dog has a body and a plurality of dog teeth, each dog tooth having a pair of opposed flanks that taper toward one another with decreasing distance to a tip of the dog tooth.

9. The clutch and actuator assembly of claim 1, wherein the first clutch dog has a plurality of first dog teeth, each of the first dog teeth having a pair of opposed first flanks and a first tip, each pair of opposed first flanks tapering toward one another with decreasing distance to a corresponding one of the first tips.

10. The clutch and actuator assembly of claim 9, wherein the second clutch dog has a plurality of second dog teeth, each of the second dog teeth having a pair of opposed second flanks and a second tip, each pair of opposed second flanks tapering toward one another with decreasing distance to a corresponding one of the second tips.

11. The clutch and actuator assembly of claim 1, wherein the output member is coaxially received about the second shaft.

12. The clutch and actuator assembly of claim 1, wherein the second shaft comprises a male splined portion that is received into a female splined portion of the second clutch dog.

13. A clutch and actuator assembly comprising:
    a first shaft;
    a first clutch dog fixedly coupled to the first shaft for common rotation, the first clutch dog having a plurality of first dog teeth, each of the first dog teeth having a pair of opposed first flanks and a first tip, each pair of opposed first flanks tapering toward one another with decreasing distance to a corresponding one of the first tips;
    a second shaft;
    a second clutch dog non-rotatably but axially slidably received on the second shaft, the second clutch dog having a plurality of second dog teeth, each of the second dog teeth having a pair of opposed second flanks and a second tip, each pair of opposed second flanks tapering toward one another with decreasing distance to a corresponding one of the second tips; and
    an actuator assembly having an output member that is configured to slide the second clutch dog on the second shaft between a first position, in which the second clutch dog is engaged to the first clutch dog, and a second position in which the second clutch dog is spaced apart from the first clutch dog so that rotary power cannot be transmitted between the first and second clutch dogs;
    wherein the actuator assembly is configured to self-lock when the output member has moved the second clutch dog into the first position.

14. The clutch and actuator assembly of claim 13, wherein the output member of the actuator assembly comprises a clutch fork.

15. The clutch and actuator assembly of claim 14, wherein the actuator assembly comprises a lead screw and wherein the clutch fork is threaded onto the lead screw.

16. The clutch and actuator assembly of claim 15, wherein a thrust bearing is disposed between the clutch fork and the second clutch dog.

17. The clutch and actuator assembly of claim 15, wherein the actuator assembly comprises a pusher and an output gear that is threaded to the pusher such that the pusher is telescopically coupled to the output gear.

18. The clutch and actuator assembly of claim 17, wherein the actuator assembly further comprises a rotary motor and a pinion gear driven by the rotary motor, the pinion gear being meshed to the output gear.

19. The clutch and actuator assembly of claim 18, wherein the pinion gear is directly driven by the rotary motor.

20. The clutch and actuator assembly of claim 13, wherein the output member is coaxially received about the second shaft.

* * * * *